United States Patent
Kwon et al.

(10) Patent No.: US 7,120,845 B2
(45) Date of Patent: Oct. 10, 2006

(54) APPARATUS AND METHOD FOR TRANSMITTING AND RECEIVING DATA ON PACKET DATA CONTROL CHANNEL

(75) Inventors: Hwan-Joon Kwon, Seoul (KR);
Ho-Kyu Choi, Songnem-shi (KR);
Dong-Hee Kim, Seoul (KR); Youn-Sun Kim, Seoul (KR)

(73) Assignee: Samsung Electronics Co., Ltd., (KR)

( * ) Notice: Subject to any disclaimer, the term of this patent is extended or adjusted under 35 U.S.C. 154(b) by 433 days.

(21) Appl. No.: 10/307,631

(22) Filed: Dec. 2, 2002

(65) Prior Publication Data

US 2003/0106006 A1 Jun. 5, 2003

(30) Foreign Application Priority Data

Nov. 30, 2001 (KR) .................. 10-2001-0075192
Dec. 11, 2001 (KR) .................. 10-2001-0078320

(51) Int. Cl.
*H06F 11/00* (2006.01)

(52) U.S. Cl. .................. 714/746; 714/752; 714/723

(58) Field of Classification Search ............. 714/752, 714/781, 785, 753, 723, 746, 755; 455/452; 375/295
See application file for complete search history.

(56) References Cited

U.S. PATENT DOCUMENTS

| | | | | |
|---|---|---|---|---|
| 5,377,208 | A | * | 12/1994 | Schneider-Obermann et al. .................. 714/761 |
| 5,511,067 | A | * | 4/1996 | Miller .................. 370/335 |
| 5,867,510 | A | * | 2/1999 | Steele .................. 714/758 |
| 6,216,004 | B1 | * | 4/2001 | Tiedemann et al. .......... 455/442 |
| 6,286,122 | B1 | * | 9/2001 | Alanara .................. 714/781 |
| 6,445,683 | B1 | * | 9/2002 | Nobuyasu et al. ........ 370/310.1 |
| 6,574,211 | B1 | * | 6/2003 | Padovani et al. ........... 370/347 |
| 6,665,522 | B1 | * | 12/2003 | Lundstrom et al. ......... 370/475 |
| 6,788,662 | B1 | * | 9/2004 | Ozluturk et al. ............ 370/335 |

* cited by examiner

*Primary Examiner*—Guy Lamarre
*Assistant Examiner*—Fritz Alphonse
(74) *Attorney, Agent, or Firm*—Dilworth & Barrese LLP (57) ABSTRACT

An apparatus and method for transmitting and receiving a PDCCH for efficient transmission of a PDCH in a communication system supporting a packet data service. PDCCHs according to the present invention enable TDM and TDM/CDM transmission of the PDCH, Especially, CRC generators and CRC checker of the present invention allow a second user to utilize control information on a first PDCCH.

20 Claims, 12 Drawing Sheets

APPARATUS AND METHOD FOR TRANSMITTING AND RECEIVING DATA ON PACKET DATA CONTROL CHANNEL

PRIORITIES

This application claims priorities to both an application entitled "Apparatus and Method for Transmitting and Receiving Data on Packet Data Control Channel" filed in the Korean Industrial Property Office on Nov. 30, 2001 and assigned Serial No. 2001-75192, and to an application entitled "Apparatus and Method for Transmitting and Receiving Data on Packet Data Control Channel" filed in the Korean Industrial Property Office on Dec. 11, 2001 and assigned Serial No. 2001-78320, the contents of both of which are incorporated herein by reference.

BACKGROUND OF THE INVENTION

1. Field of the Invention

The present invention relates generally to an apparatus and method for providing a packet data service in a communication system, and in particular, to an apparatus and method for transmitting and receiving a PDCCH (Packet Data Control Channel) to detect a packet data transmission and reception scheme.

2. Description of the Related Art

While a typical mobile communication system supports voice service only, user demands and the development of mobile communication technology have developed a mobile communication system that additionally supports data service.

In a mobile communication system supporting multimedia service including voice and data service, a plurality of users receive voice and data service in the same frequency band. To do so, TDM (Time Division Multiplexing) or CDM (Time Division Multiplexing/Code Division Multiplexing) is supported for data transmission. These transmission schemes are not sufficient to provide service to many users. Thus there is a need for exploring a method of accommodating more service users.

The mobile communication system uses a PDCH (Packet Data Channel) and a PDCCH. The PDCH delivers packet data on a PLP (Physical Layer Packet) basis and the PDCCH delivers control information about the PDCH. The PDCCH is also used to detect the transmission and reception scheme of packet data transmitted on the PDCH.

Figure 1:
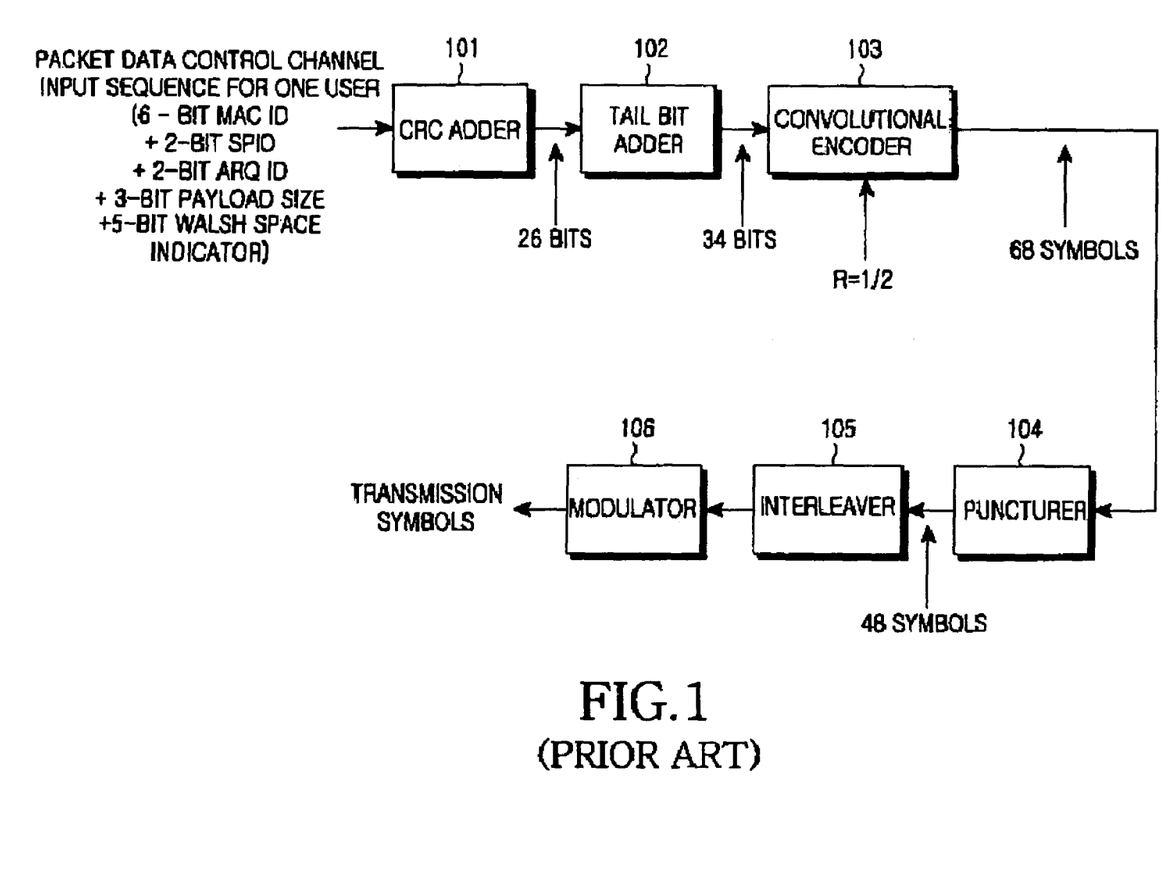
FIG. 1 is a block diagram of a conventional PDCCH transmitter.

FIG. 1 is a block diagram of a conventional PDCCH transmitter when only TDM is supported for PDCCH transmission.

Referring to FIG. 1, it is assumed that control information transmitted on the PDCCH, a PDCCH input sequence is 18 bits though it is not limited to 18 bits.

The PDCCH input sequence includes a 6-bit MAC (Medium Access Control) identifier (ID), a 2-bit SPID (Sub-Packet ID), a 2-bit ARQ (Automatic Repeat Request) ID, a 3-bit payload size, and a 5-bit Walsh space indicator (WSI). The MAC ID is assigned to a user that is to receive a high-speed packet data service during system access in order to identify the user.

In general, a high-speed packet data transport channel delivers data on a sub-packet basis in a mobile communication system supporting high-speed packet transmission. The SPID identifies a sub-packet to support retransmission. The ARQ ID identifies a parallel transport channel to support continuous data transmission to one user. The payload size is the number of bits in one sub-packet. The Walsh space indicator is an information indicating Walsh codes used for the PDCH.

At system access, all MSs (Mobile Stations) that are to receive the high-speed packet data service are assigned MAC IDs from a BS (Base Station). Each time the MSs receive a PDCCH, they demodulate the PDCCH and determine whether a packet is destined for them. If the packet is destined for a particular MS, the MS demodulates a PDCH using the control information of payload size, SPID, ARQ ID, a Walsh space indicator on the PDCCH.

In operation, a CRC adder 101 adds eight CRC bits to the 18-bit PDCCH input sequence to allow detection of errors in the control information. As the number of CRC bits increases, transmission error detection performance increases.

A tail bit adder 102 adds eight tail bits with all 0s to the CRC-attached 26-bit control information received from the CRC adder 101. A convolutional encoder 103 encodes the output of the tail bit adder 102 at a code rate of ½.

A puncturer 104 punctures 20 symbols in the code symbols received from the convolutional encoder 103 to minimize performance degradation and match to a desired data rate. An interleaver 105 interleaves the punctured symbols to permute the sequence of the symbols and thus reduce burst error rate. A modulator 106 modulates the interleaved symbols in a modulation scheme such as QPSK (Quadrature Phase Shift Keying).

Figure 2:
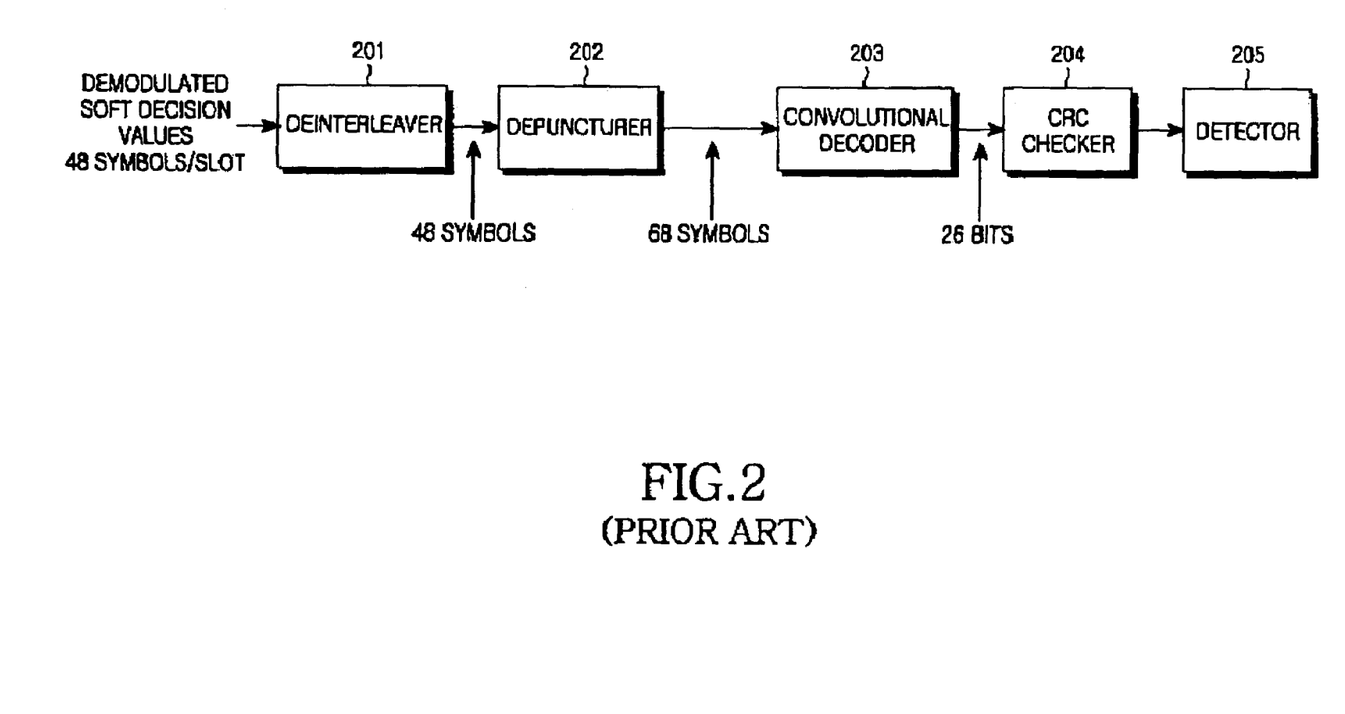
FIG. 2 is a block diagram of a conventional PDCCH receiver.

FIG. 2 is a block diagram of a conventional PDCCH receiver when only TDM is supported for data transmission. Referring to FIG. 2, data received from the PDCCH transmitter illustrated in FIG. 1 on a radio channel is converted to transmission symbols through frequency down-conversion. Then, a deinterleaver 201 deinterleaves the symbols, a depuncturer 202 depunctures the deinterleaved symbols, and a convolutional decoder 203 decodes the depunctured symbols. Then a CRC checker 204 CRC-checks the decoded symbols to determine whether the received data has errors. A packet data control information detector 205 detects 18-bit packet data control information when the received data turns out good by the CRC check and ends the reception operation when it turns out failed.

As described above, the conventional PDCCH supports only TDM transmission of the PDCCH. Due to the demand for accommodating more users, a system supporting TDM and CDM simultaneously (TDM/CDM) for data transmission on the PDCH has been suggested. In such a system, different Walsh codes are assigned to a plurality of users for the same time period, for data transmission. Thus, the conventional transmitter and receiver are not suitable for the system because they cannot identify users and transmit data accurately.

SUMMARY OF THE INVENTION

It is, therefore, an object of the present invention to provide an apparatus and method for transmitting and receiving a PDCCH to support transmission of a PDCH in TDM/CDM.

It is another object of the present invention to provide an apparatus and method for transmitting and receiving a PDCCH to simultaneously transmit packet data to a plurality of users.

To achieve the above and other objects, according to the present invention, a control information transmitting apparatus of a base station (BS) is proposed in a mobile communication system. The BS transmits data to a mobile station (MS), and transmits the identifier (ID) of the MS and control information about the data to the MS. The control information transmitting apparatus comprises an error detection bit generator, an exclusive-OR operator and a transmitter. The error detection bit generator generates first error detection bits. The exclusive-OR operator generates second error detection bits by exclusive-OR gating the first error detection bits and the MS ID. The transmitter generates new control information by attaching the second error detection bits to the control information and transmits the new control information.

Also, according to the present invention, a control information receiving apparatus of a mobile station (MS) is proposed in a mobile communication system. A base station (BS) transmits data and error detection control information about the data to the MS. The control information includes first error detection bits. The control information apparatus comprises a receiver, an exclusive-OR operator and a determiner. The receiver receives the control information. The exclusive-OR operator generates second error detection bits by exclusive-OR gating the first error detection bits with a identifier (ID) of the MS. The determiner compares the first error detection bits with the second error detection bits and, if the first error detection bits are identical to the second error detection bits, determines that the control information is for the MS.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENTS

Preferred embodiments of the present invention will be described herein below with reference to the accompanying drawings. In the following description, well-known functions or constructions are not described in detail since they would obscure the invention in unnecessary detail.

A PDCCH transmitter and a PDCCH receiver in a mobile communication system supporting packet data transmission according to an embodiment of the present invention will be described below. The PDCCH transmitter is provided with a CRC adder for adding CRC bits to control information to allow a receiver to detect errors in the control information. Besides a mobile communication system, the PDCCH transmitter and receiver can be applied to communication systems where packet data service is provided and control information is transmitted for efficient packet data transmission.

According to the present invention, the PDCCH is so configured that it can support PDCH transmission in TDM/CDM.

In TDM, the PDCH delivers data to one user for a predetermined time, using all available Walsh codes, whereas in TDM/CDM, the PDCH delivers data to a plurality of users for a predetermined time, using different Walsh codes assigned to the users. To implement the TDM/CDM PDCH transmission, information about Walsh codes used for each user must be transmitted to the user.

Depending on whether CDM is used for a PDCH transmission and how many users receive a PDCH in CDM, a transmitter transmits packet data control information correspondingly to each user. In the embodiment of the present invention, a first PDCCH and a second PDCCH are adopted to deliver packet data control information to two users when the PDCH is transmitted to them in CDM. It is to be noted here that the number of PDCCHs can be increased as more users receive the PDCH in CDM.

The feature of the present invention is that a PDCCH transmitter generates a CRC for the second PDCCH using a Walsh space indicator included in the packet data control information of the first PDCCH, and a PDCCH receiver separately demodulates the first and second PDCCHs using Walsh functions assigned to them and CRC-checks them commonly using the Walsh space indicator in the first PDCCH.

Figure 3:
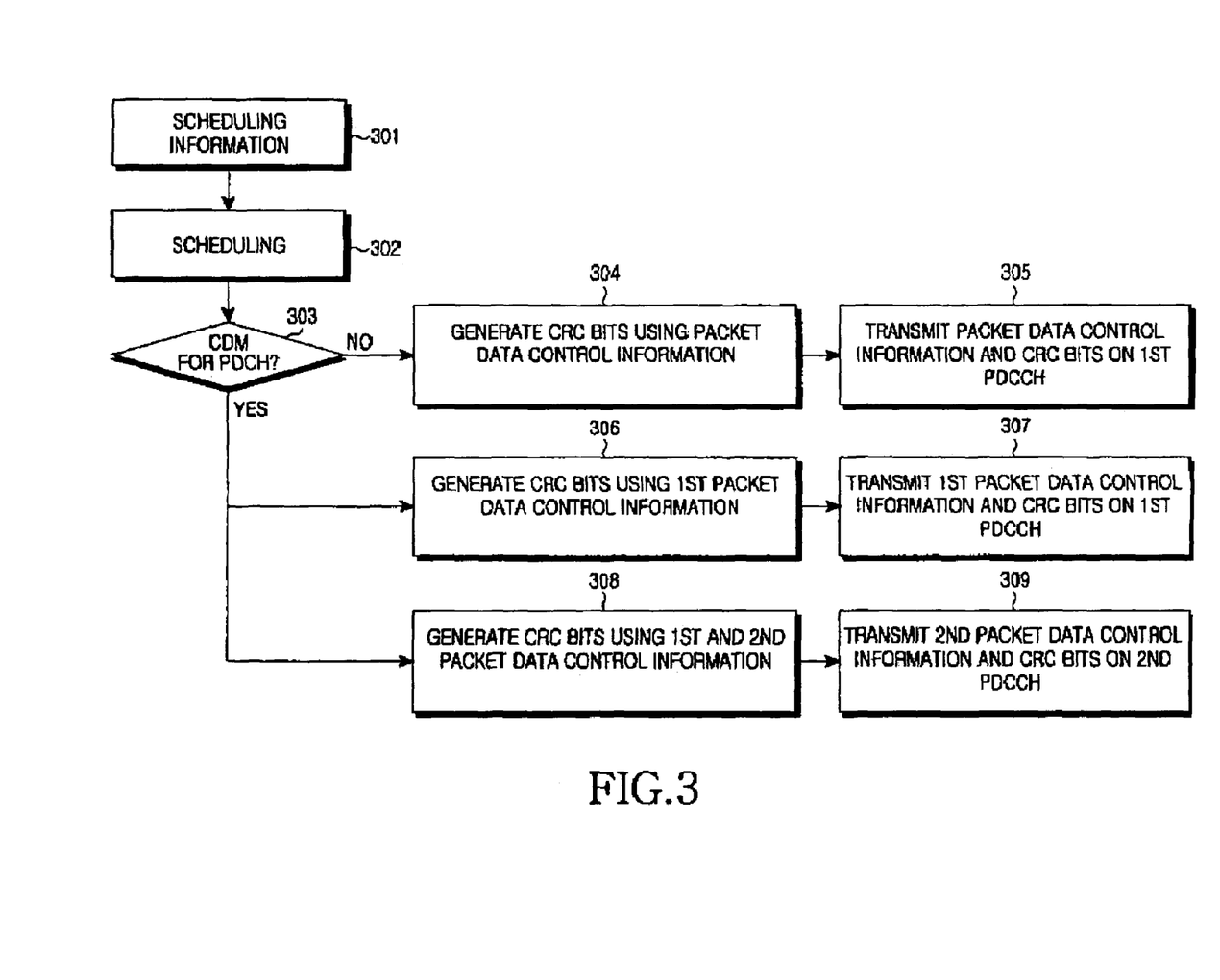
FIG. 3 is a flowchart illustrating a PDCCH transmitting operation according to an embodiment of the present invention.

FIG. 3 is a flowchart illustrating a PDCCH transmitting operation according to an embodiment of the present invention. It is assumed that the PDCCH transmitting operation is performed in a BS when two users receive a PDCH in TDM/CDM. As stated before, the number of users that receive the PDCH in TDM/CDM is not limited.

Referring to FIG. 3, the BS receives information required for scheduling in step 301. The scheduling information includes information about the quality of services provided to MSs and the channel states of the MSs. Since the scheduling information is system-dependent, its detailed description is not provided here. In step 302, the BS performs scheduling. The scheduling is also dependent on scheduler implementation.

The BS determines whether CDM is applied to a PDCH in step 303. According to the scheduling, only TDM is used or TDM and CDM are used in combination. When CDM is used, at least two users are assigned to one time slot. When the PDCH is transmitted in TDM/CDM, the BS proceeds to steps 306 and 308. When CDM is not used for the PDCH, the BS proceeds to step 304.

In step 304, the BS adds CRC bits to packet data control information for a user selected by the scheduling in a predetermined method, which will be described later with reference to FIGS. 5A and 5B. The BS transmits the CRC-attached packet data control information to the user on the first PDCCH in step 305. A transmitter for transmitting the first PDCCH will be described later in more detail with reference to FIG. 4.

In the case of PDCH transmission in TDM/CDM, the BS generates packet data control information for a first user in step 306 and transmits it to the first user in step 307. The BS generates packet data control information for a second user in step 308 and transmits it to the second user in step 309. Specifically, the BS adds unique CRC bits to each piece of first and second packet data control information and transmits the resulting first and second packet data control information respectively on the first and second PDCCHs.

Figure 4:
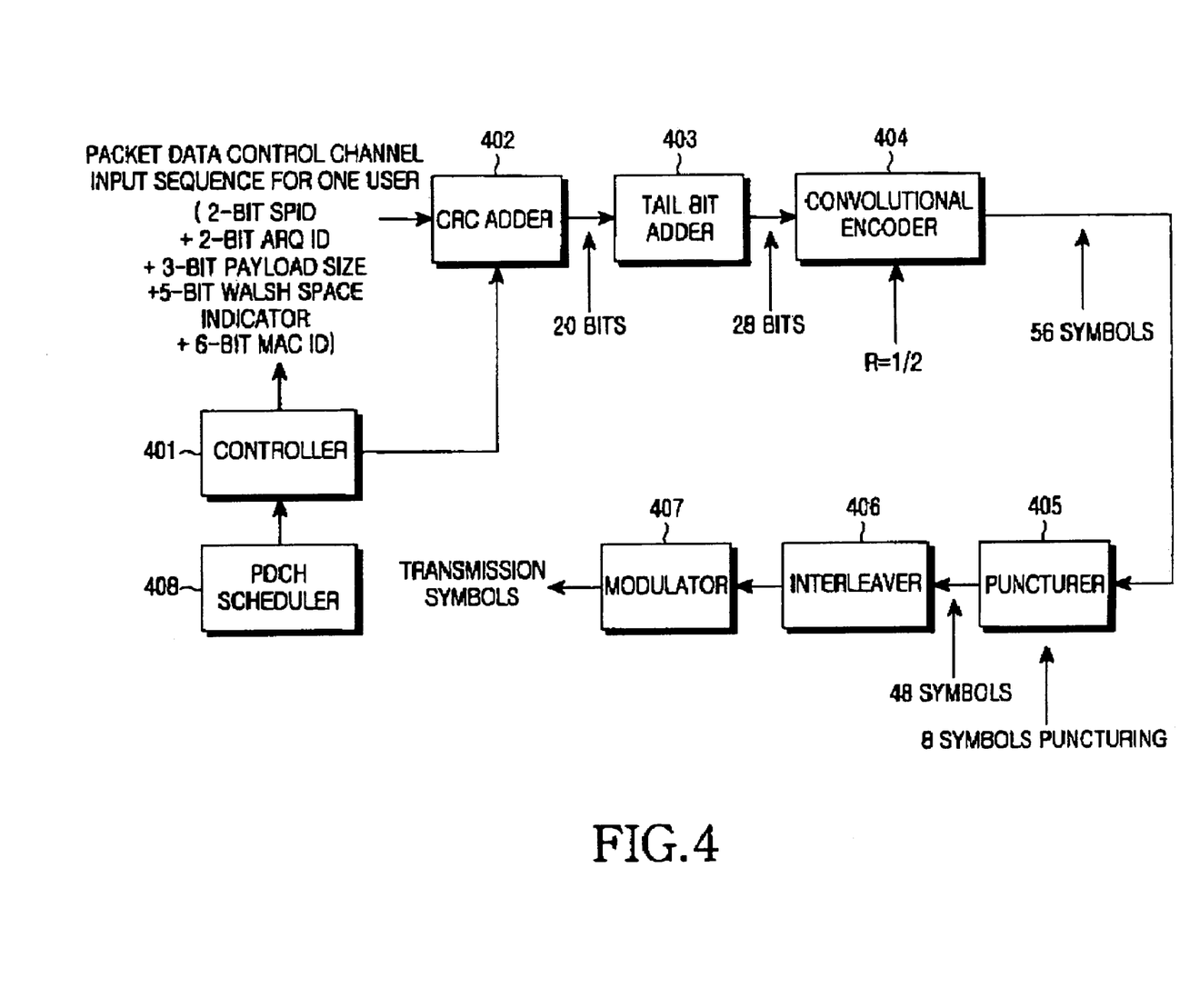
FIG. 4 is a block diagram of a PDCCH transmitter for transmitting first and second PDCCHs according to the embodiment of the present invention.

FIG. 4 is a block diagram of a PDCCH transmitter for transmitting the first and second PDCCHs according to the embodiment of the present invention. In the case of PDCH transmission in TDM, one PDCCH having a structure depicted in FIG. 4 is transmitted. On the other hand, in the case of PDCH transmission in TDM/CDM, two PDCCHs of the structure are transmitted. For clarity of description, a PDCCH that delivers packet data control information to a first user will be referred to as a first PDCCH (PDCCH 1) and a PDCCH that delivers packet data control information to a second user, as a second PDCCH (PDCCH 2). In addition, packet data control information in the first PDCCH is called first packet data control information, and packet data control information in the second PDCCH, second packet data control information. That is, the first and second PDCCHs have the same structure and deliver the first and second packet data control information to the first and second users in different manners, respectively.

Referring to FIG. 4, the PDCCH transmitter according to the present invention includes a CRC adder 402, a tail bit adder 403, a convolutional encoder 404, a puncturer 405, an interleaver 406 and a modulator 407, like a conventional PDCCH transmitter shown in FIG. 1. Also, the PDCCH transmitter includes a controller 401 and a PDCH scheduler 408. The controller 401 receives from the PDCH scheduler 408 information indicating whether CDM is applied to the PDCH at a predetermined point in time and transmits a PDCCH input sequence for a scheduled user to the CRC adder 402 according to the received information. Under the control of the controller 401, the CRC adder 402 generates CRC bits and encodes the PDCCH input sequence and the CRC bits together in a predetermined method. The structure and operation of the CRC adder 402 will be described later in more detail with reference to FIGS. 5A, 5B and 6.

The PDCCH input sequence is assumed to be 18 bits here. A 5-bit Walsh space indicator is included in the PDCCH input sequence to indicate Walsh codes assigned to the PDCH for the user. For instance, the Walsh space indicator may be an information indicating a last one of Walsh codes available for a data service for a particular user.

Figure 5A:
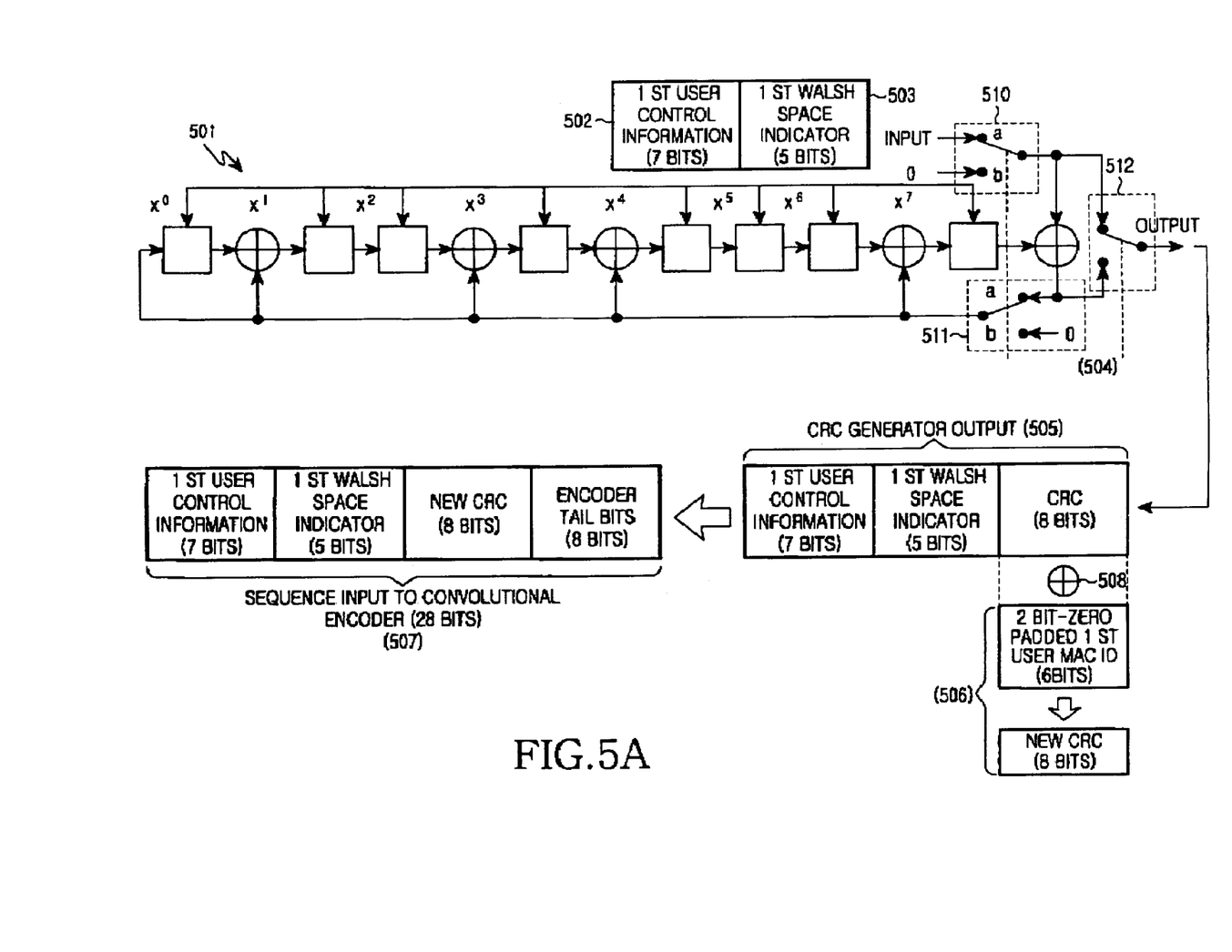
FIGS. 5A and 5B illustrate embodiments of a CRC generator for the first PDCCH according to the present invention.
Figure 5B:
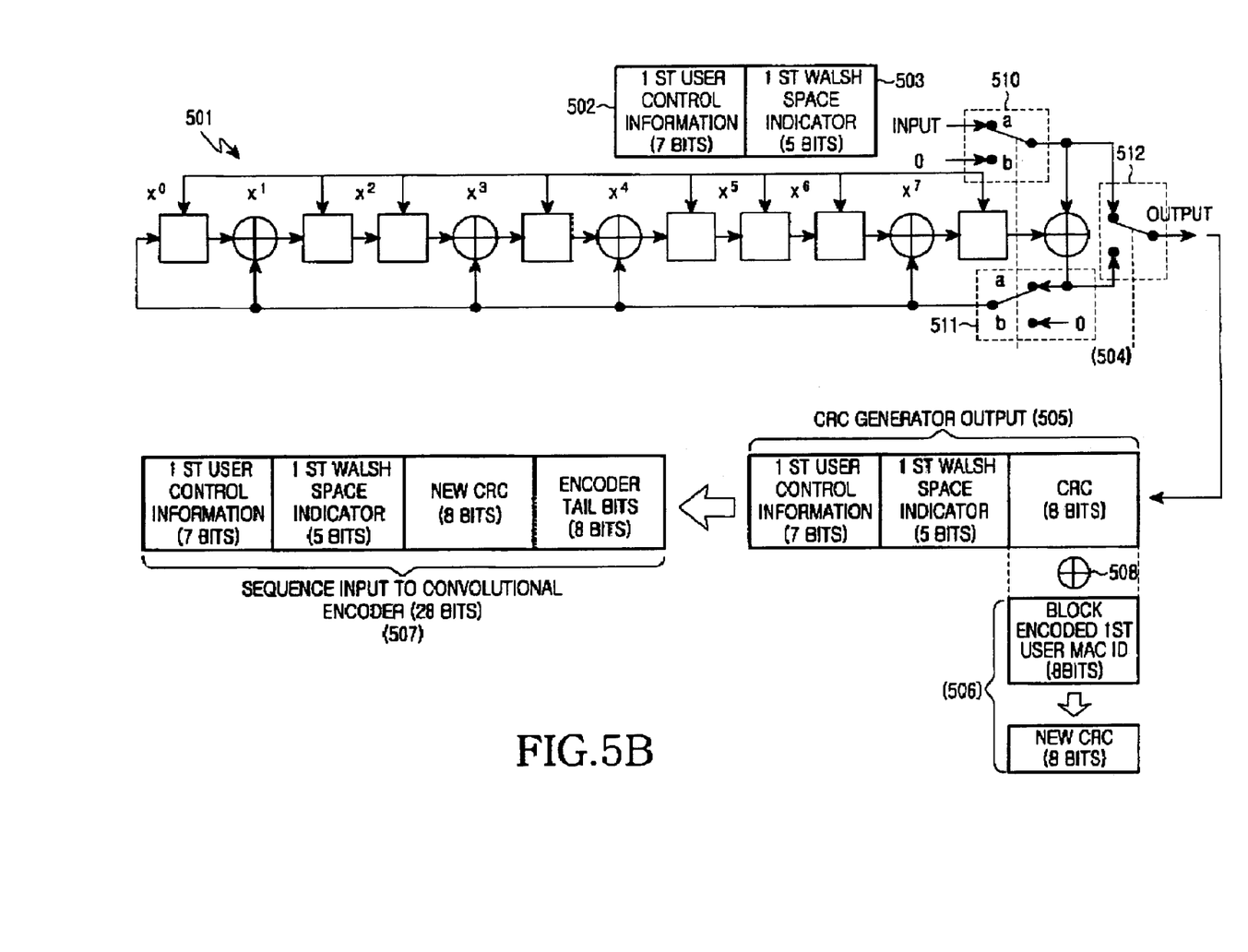

FIGS. 5A and 5B illustrate embodiments of generation of CRC bits for the first PDCCH according to the present invention. Referring to FIGS. 5A and 5B, processing a first PDCCH input sequence received from the controller 401 in the CRC adder 402 will be described.

Figure 6:
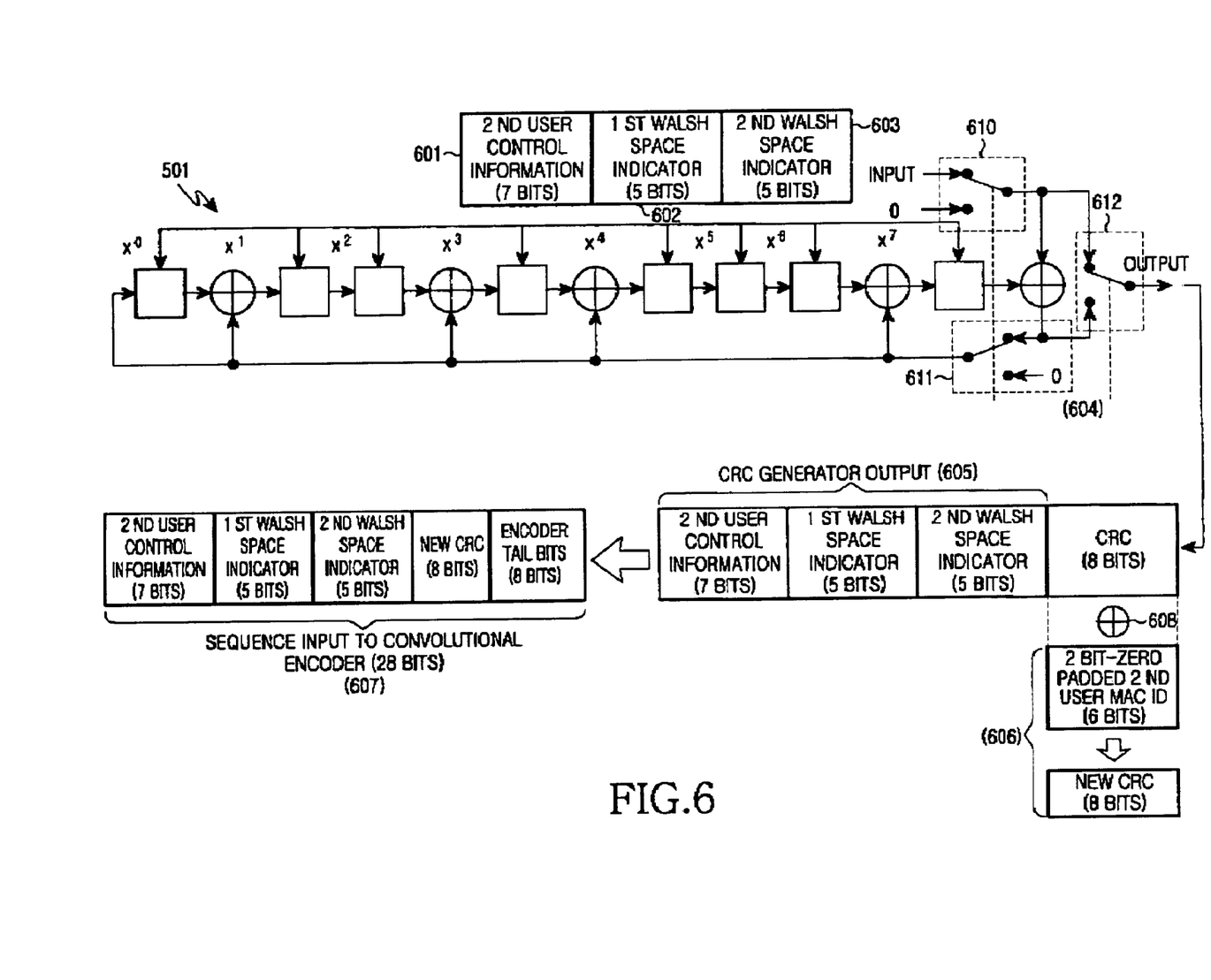
FIG. 6 illustrates a CRC generator for the second PDCCH according to the embodiment of the present invention.

In FIG. 5A, reference numeral 501 denotes a typical CRC generator. A first switch 510 receives 7-bit first user control information 502 and a 5-bit first Walsh space indicator 503 through a first input terminal and a zero through a second input terminal. Switches illustrated in FIGS. 5A, 5B and 6 are of the same structure as the first switch 510. The first switch 510 is controlled in a method that will be described later. The 7-bit first user control information 502 is a 2-bit SPID, a 2-bit ARQ ID, and a 3-bit payload size for a first user. That is, the controller 401 controls the 12-bit control information 502 and 503 except for a 6-bit MAC ID to be input to the CRC generator 501.

Reference numeral 504 denotes switching in the CRC generator 501. First, second, and third switches 510, 511, and 512 switch up for the first 12 bits of the input control information and switch down for the other 8 bits. More specifically, for the first 12 bits, the first switch 510 receives the 12-bit control information, the third switch 512 selects the output of the first switch 510 between the outputs of the first switch 510 and an adder, and the second switch 511 selects the output of the adder between the output of the adder and zero. For the last 8 bits, the first and second switches 510 and 511 switch to output zeroes and the third switch 512 switches to the output of the adder. Reference numeral 505 denotes bits output from the CRC generator 501. The CRC generator output includes the 12-bit input control information and the resulting 8 CRC bits. Reference numeral 506 denotes generation of new CRC bits by exclusive-OR gating the 8 CRC bits and a first MAC ID. The exclusive-OR gating operation is performed by the exclusive-OR gate 508. To match to the number of the CRC bits, the 6-bit MAC ID is padded with two bits of zeroes. For example, if the MAC ID is "010110", it is 2-bit zero-padded to "00010110" or "01011000". If the number of bits of the MAC ID is identical to the CRC bits, only the exclusive-OR gating operation is performed.

While the above CRC checker generates an 8-bit error detection code, it is merely exemplary. Thus it is obvious that the CRC checker can be configured to generate an error detection code of 10, 12, 14, or 16 bits to improve error detection performance.

As described above, to match the bit number of the MAC ID to the number of the CRC bits, two zeroes are padded to the front or end of the MAC ID in step 506. In this case, some MSs may take the zero-padded MAC ID for their MAC IDs. For example, if the MAC ID is "001100", MSs having MAC IDs different from the MAC ID only in one bit (e.g., 001000, 101100, 000100, etc.) may take the MAC ID of 001100 for their MAC IDs if an error occurs to the different bit. The probability of wrong determination regarding to the MAC ID in such MSs is higher than that in MSs having MAC IDs different from the transmitted MAC ID in a plurality of bits (e.g., 110011, 110001, etc.).

To solve this problem, a MAC ID is block-encoded and assigned to an MS in another embodiment of CRC generation according to the present invention, as illustrated in FIG. 5B. Referring to FIG. 5B, a MAC ID is encoded using an (n, k) block code (n is the bit number of an error detection code and k is the bit number of the MAC ID) and a block-encoded sequence is assigned as an actual MAC ID. In a system using 6 bits for a MAC ID and 8 bits for an error detection code, for example, an 8-bit sequence resulting from (8, 6) block encoding is assigned as a MAC ID by a signaling message at system access. While a BS assigns a 6-bit MAC ID to a corresponding MS at system access in FIG. 5A, it assigns an 8-bit MAC ID to the MS in FIG. 5B. It is to be noted here that the BS does not use all 256 MAC IDs that can be represented by 8 bits, but uses only 64 (8, 6) block-encoded sequences as MAC IDs. In the latter case, the BS simply exclusive-OR gates an error detection code and a MAC ID without padding the MAC ID with zeroes in step 506 because they have the same number of bits. Similarly, an MS exclusive-OR gates a block sequence corresponding to its MAC ID and a received error detection code without the need for zero-padding of the MAC ID by the exclusive-OR gate 508. The assignment of a block-encoded sequence as a MAC ID reduces the error probability of an MS having a MAC ID identical to a transmitted MAC ID in relatively many bits. In (n, k) block encoding, the bit number of an error detection code, n can be one of 8, 10, 12, 14, 16, etc., and the bit number of a MAC ID, k can be one of 6, 7, 8, 9, 10, etc.

According to the embodiment of the present invention illustrated in FIG. 5B, the BS transmits packet data control information as follows. This embodiment is also applicable to a second PDCCH transmitter illustrated in FIG. 6.

(Step 1) The CRC adder 402 adds first n CRC bits to control information. The control information may include a Walsh space indicator, an SPID, a payload size, and an ARQ ID.

(Step 2) The k-bit MAC ID of an MS to receive packet data is encoded in an (n, k) block encoder (not shown). Here, n is the number of the first CRC bits and k is the bit number of the MAC ID. For example, n is 8 and k is 6.

(Step 3) An exclusive-OR gate 508 in FIG. 5B exclusive-OR gates the first CRC bits and the block-encoded MAC ID and outputs the resulting bits as second CRC bits.

(Step 4) After the second CRC bits are added to the control information, a transmitter transmits the CRC-attached control information. The transmitter may include a tail bit adder 403, a convolutional encoder 404, a puncturer 405, an interleaver 406, and a modulator 407 illustrated in FIG. 4.

The thus-generated second 8 CRC bits and the 12-bit control information 502 and 503 are input to a tail bit adder 403. In FIGS. 5A and 5B, reference numeral 507 denotes a final 28-bit sequence input to the convolutional encoder 404 illustrated in FIG. 4.

FIG. 6 illustrates generation of CRC bits for the second PDCCH according to the embodiment of the present invention. Referring to FIG. 6, processing a second PDCCH input sequence received from the controller 401 in the CRC adder 402 will be described.

Reference numeral 501 denotes the typical CRC generator identical to that illustrated in FIGS. 5A and 5B. Reference numerals 601, 602 and 603 denote control information input to the CRC generator 501. Second user control information 601 is a 2-bit SPID, a 2-bit ARQ ID, and a 3-bit payload size for a second user. A first Walsh space indicator 602 is 5-bit Walsh space information about a packet for the first user, delivered on the first PDCCH. A second Walsh space indicator 603 is 5-bit Walsh space information about a packet for the second user, delivered on the second PDCCH. Although first and second PDCCH transmitters are the same in structure as illustrated in FIG. 4, they generate different control information. The controller 401 controls the 12-bit control information 601 and 603 except for a second 6-bit MAC ID, and the first Walsh space indicator 602 to be input to the CRC generator 501 illustrated in FIG. 6. That is, the first Walsh space indicator 602 as well as the second user control information and the second Walsh space indicator 601 and 603 are applied to the input of the CRC generator for the second PDCCH.

Reference numeral 604 denotes switching in the CRC generator 501. First, second, and third switches 610, 611, and 612 switch up for the first 17 bits of the input control information and switch down for the other 8 bits. More specifically, for the first 17 bits, the first switch 610 receives the 17-bit control information, the third switch 612 selects the output of the first switch 610 between the outputs of the first switch 610 and an adder, and the second switch 611 selects the output of the adder between the output of the adder and zero. For the last 8 bits, the first and second switches 610 and 611 switch to output zeroes and the third switch 612 switches to the output of the adder.

Reference numeral 605 denotes bits output from the CRC generator 501. The CRC generator output includes the 17-bit input control information and the resulting 8 CRC bits. Reference 606 denotes generation of new CRC bits by exclusive-OR gating the 8 CRC bits and the second MAC ID. The exclusive-OR gating operation is performed by the exclusive-OR gate 608. To match to the number of the CRC bits, the 6-bit MAC ID is padded with two bits of zeroes as indicated. For example, if the MAC ID is "010110", it is 2-bit zero-padded to "00010110" or "01011000".

The new 8 CRC bits and the 17-bit control information 601, 602, and 603 are applied to the input of the tail bit adder 403 illustrated in FIG. 4. Reference numeral 607 denotes a final 28-bit sequence input to the convolutional encoder 404 illustrated in FIG. 4.

As indicated by reference numeral 607, while the 5-bit first Walsh space indicator 602 has been used in CRC generation, it is not actually transmitted. In the same manner as CRC bits are generated for the second PDCCH, third user control information, the second Walsh space indicator, and a third Walsh space indicator are applied to the input of a CRC generator for a third PDCCH.

Figure 7:
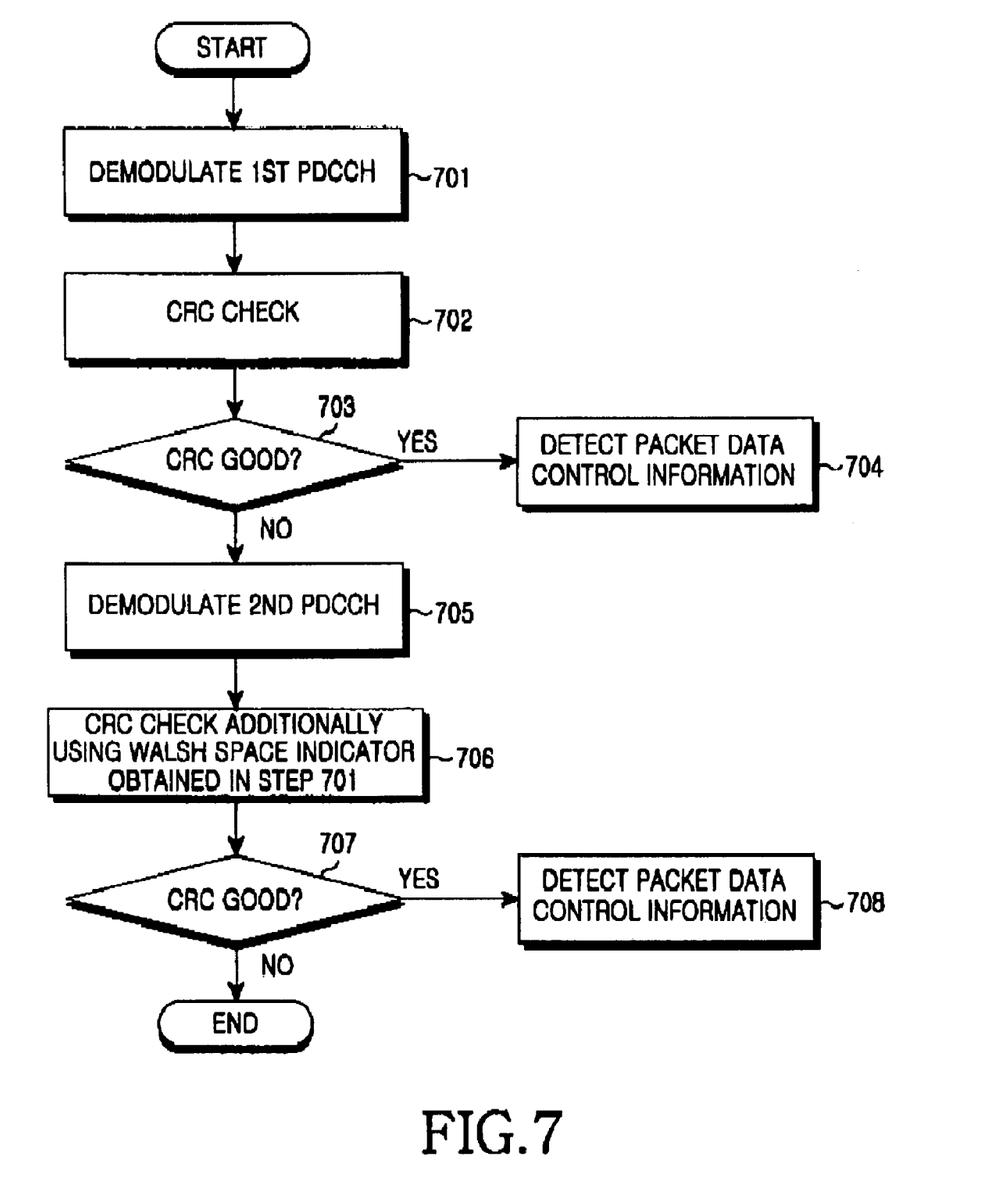
FIG. 7 is a block diagram of a PDCCH receiving operation according to the embodiment of the present invention.

FIG. 7 is a flowchart illustrating a PDCCH receiving operation according to the embodiment of the present invention.

Referring to FIG. 7, a PDCCH receiver receives and demodulates a first PDCCH in step 701. The structure and operation of the PDCCH receiver will be described later with reference to FIG. 8. Then the PDCCH receiver CRC-checks the first PDCCH in step 702. If the first PDCCH is normal, the PDCCH receiver goes to step 704 and if it is failed, the PDCCH receiver goes to step 705. In step 704, considering that the first PDCCH has its packet data control information, the PDCCH receiver acquires the packet data control information.

In step 705, the PDCCH receiver receives and demodulates a second PDCCH. Here, steps 701 and 705 can be successive or performed in parallel.

The PDCCH receiver CRC-checks the second PDCCH additionally using a first Walsh space indicator included in the first PDCCH in step 706. This will be described in more detail with reference to FIG. 10.

If the second PDCCH is normal, the PDCCH receiver acquires packet data control information from the second PDCCH, considering that the second PDCCH has its packet data control information in step 708. On the other hand, if the second PDCCH is failed, the PDCCH receiver prepares to receive for the next time period, considering that no packet data and packet data control information has been transmitted for the current time period. Because the PDCH is transmitted in TDM/CDM to two users, the routine is terminated. However, as is the case, when more users receive the PDCH in TDM/CDM, the routine continues.

Figure 8:
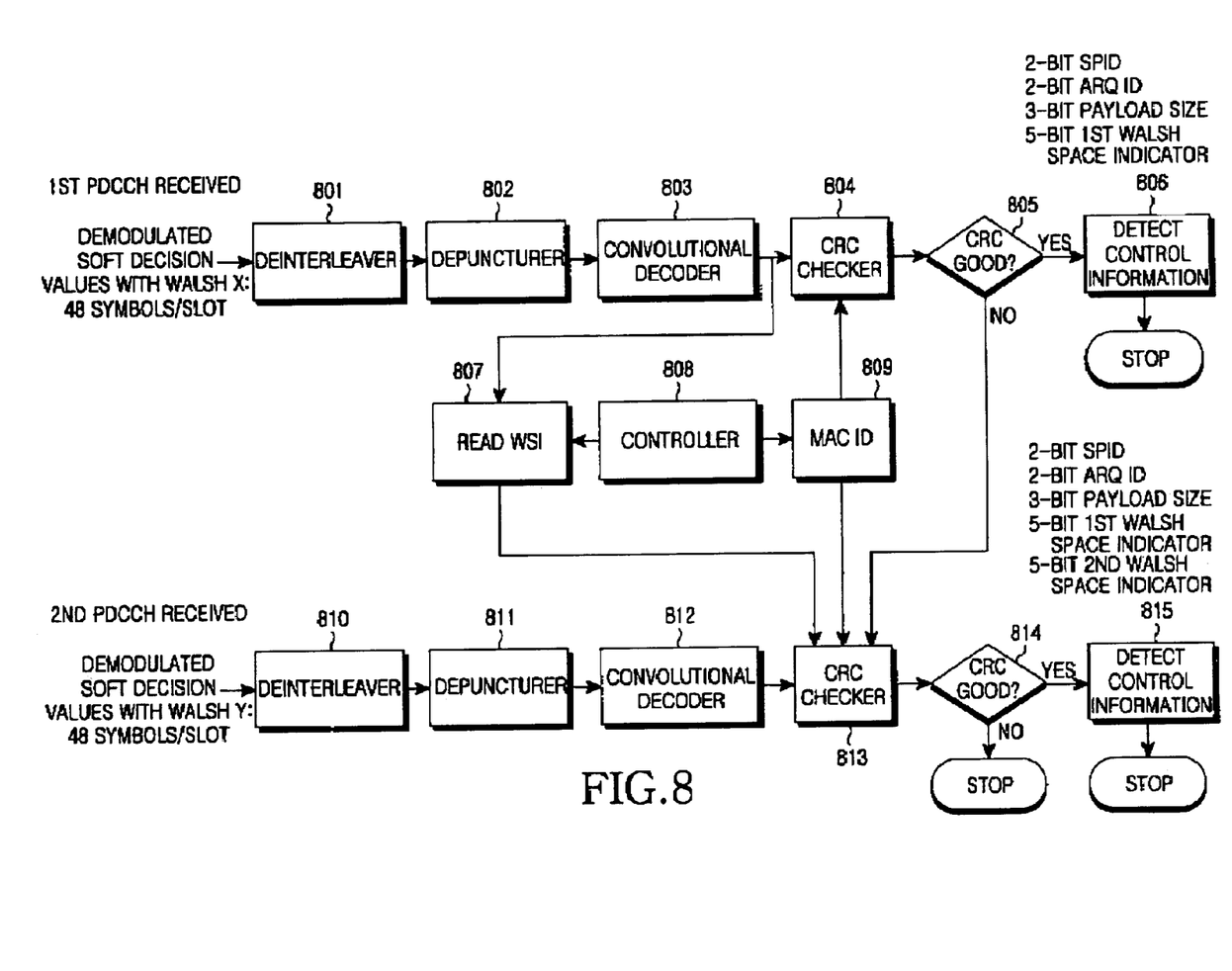
FIG. 8 is a block diagram of a PDCCH receiver according to the embodiment of the present invention.
Figure 9A:
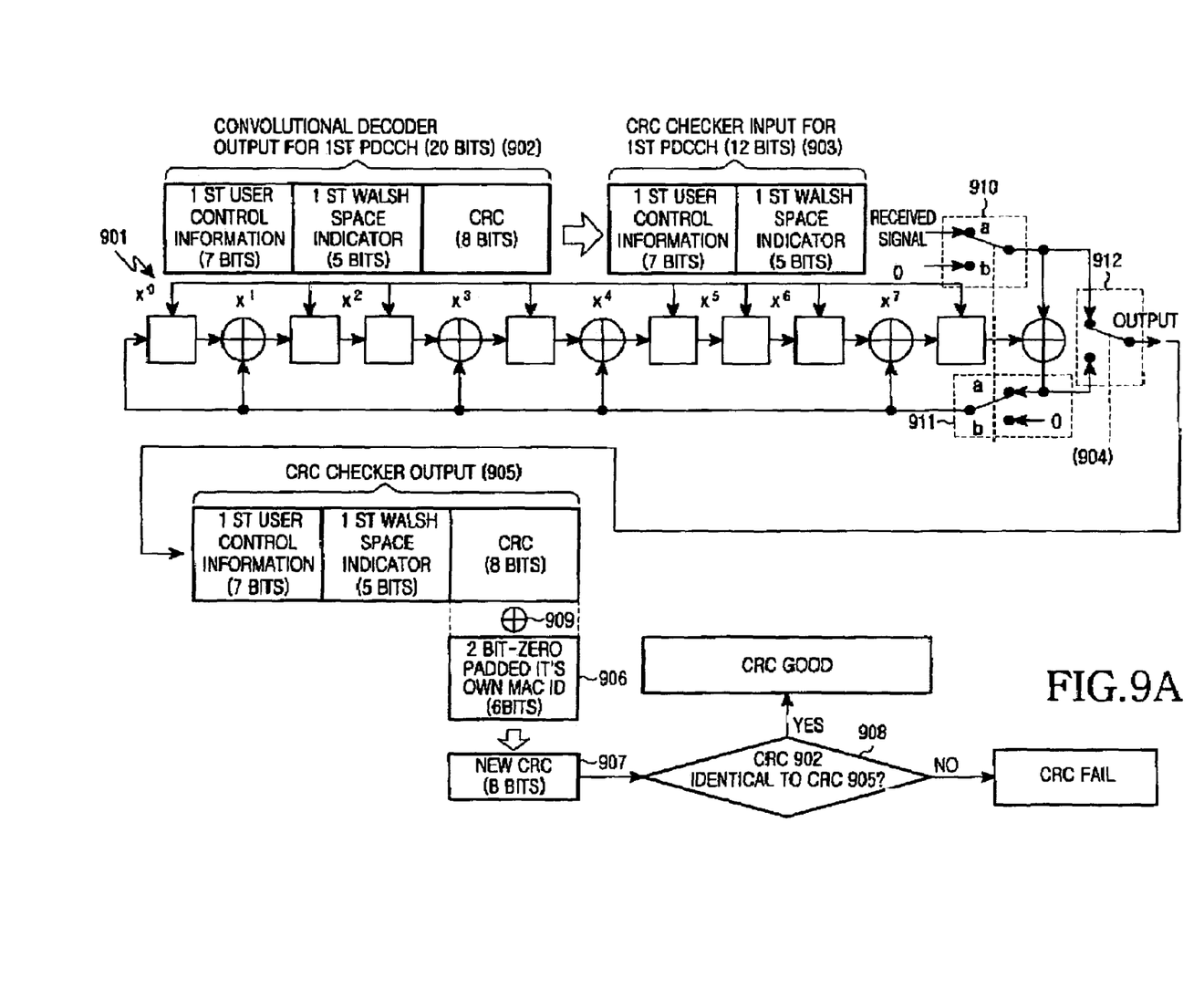
FIGS. 9A and 9B illustrate embodiments of a CRC checker for the first PDCCH according to the embodiment of the present invention.
Figure 9B:
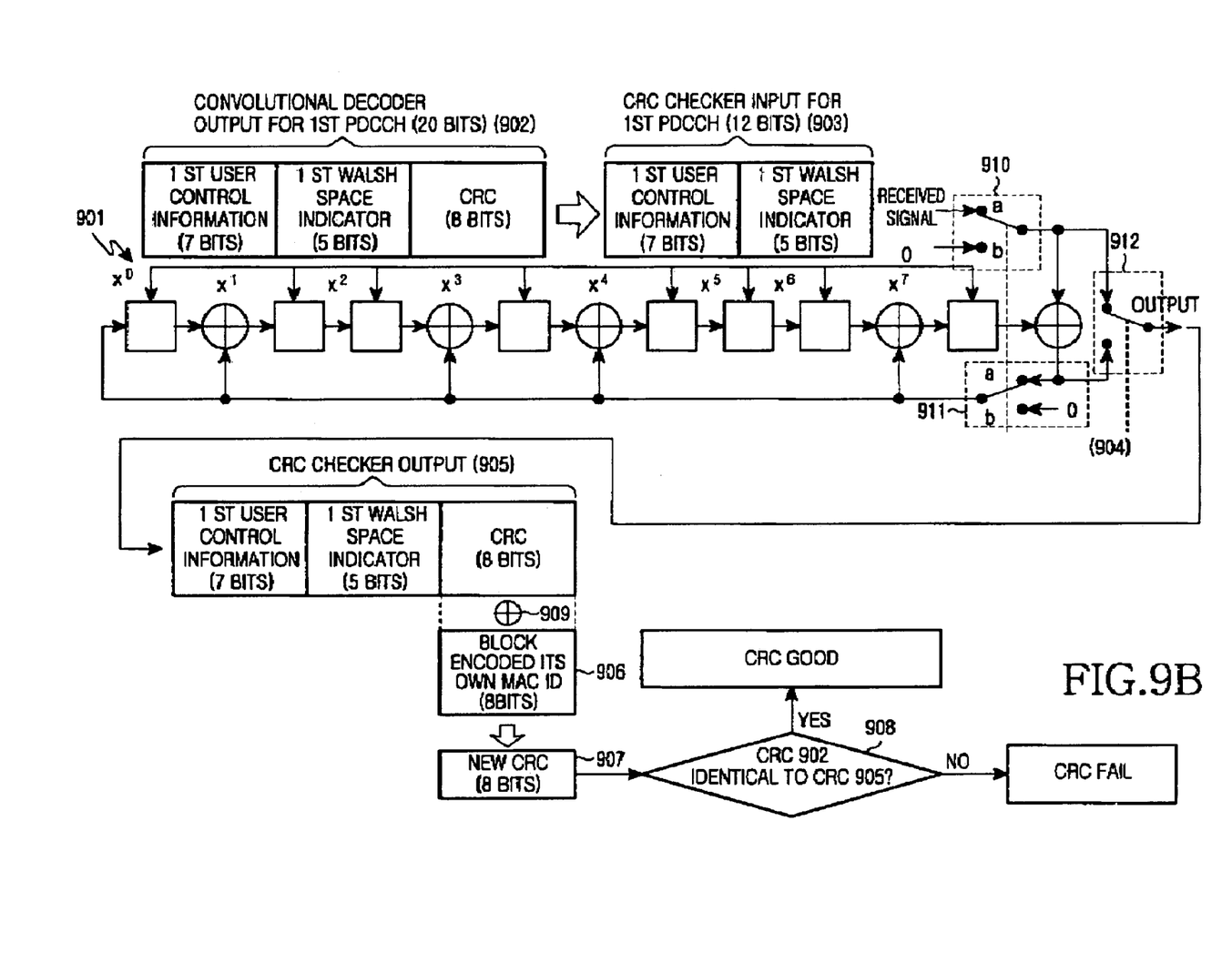

FIG. 8 is a block diagram of the PDCCH receiver according to the embodiment of the present invention. Referring to FIG. 8, 48 demodulated symbols of the first PDCCH are deinterleaved in a deinterleaver 801 and depunctured in a depuncturer 802. The depunctured symbols are decoded at a code rate of ½ in a convolutional decoder 803. After tail bits are removed from the decoded symbols, a CRC checker 804 CRC-checks the decoded symbols using the MAC ID 809 of the PDCCH receiver under the control of a controller 808 as illustrated in FIGS. 9A and 9B. If the CRC check turns out good, a determiner 805 obtains a 2-bit SPID, a 2-bit ARQ ID, a 3-bit payload size, and a 5-bit Walsh space indicator from the first PDCCH, considering that the first PDCCH is destined for the PDCCH receiver.

To extract packet data control information from a second PDCCH in parallel or successively to the operations of the deinterleaver 801, the depuncturer 802, and the convolutional decoder 803, a deinterleaver 810, a depuncturer 811, and a convolutional decoder 812 are provided to the PDCCH receiver. They operate in parallel to their counterparts for the first PDCCH in FIG. 8. Data received on the second PDCCH is subject to deinterleaving, depuncturing, and convolutional decoding in the deinterleaver 810, the depuncturer 811, and the convolutional decoder 812 in the same manner as the first PDCCH is processed. A CRC checker 813 is activated or deactivated depending on the CRC check result of the first PDCCH in the CRC checker 804. If the first PDCCH is failed, the CRC checker 813 CRC-checks the second PDCCH. If the first PDCCH is normal, it does not operate. During the CRC check, the CRC checker 813 uses both the first Walsh space indicator 807 and the 6-bit MAC ID 809 of the PDCCH receiver under the control of the controller 808, which will be described later with reference to FIG. 10.

If the CRC check turns out good, a determiner 814 obtains a 2-bit SPID, a 2-bit ARQ ID, a 3-bit payload size, and a 5-bit Walsh space indicator from the second PDCCH, considering that the second PDCCH is destined for the PDCCH receiver. When more users receive the PDCH in TDM/CDM, packet data control information is detected in the same manner.

FIGS. 9A and 9B illustrate embodiments of a CRC checker for CRC-checking the first PDCCH under the control of the controller 808 illustrated in FIG. 8.

Referring to FIG. 9A, reference numeral 901 denotes a typical CRC checker, reference numeral 902 denotes a 20-bit convolutional decoder output sequence of the first PDCCH, and reference numeral 903 denotes a 12-bit sequence of the first PDCCH input to the CRC checker 901. Reference numeral 904 denotes switching in the CRC checker 901. Switches 910, 911 and 912 are the same in structure to the switches illustrated in FIGS. 5A, 5B and 6. For the 12-bit input sequence, the switches 910, 911, and 912 switch up, and for the following 8 bits, they switch down. For the first 12 bits, the switches 910 and 911 switch to input signals other than zero. The switch 912 switches to the output of the switch 910. Then for the next 8 bits, the switches 910 and 911 switch to output zeroes, and the switch 912 switches to the output of an adder.

Reference numeral 905 denotes bits output from the CRC checker 901. The CRC checker output includes the 12-bit input sequence and 8 CRC bits. Reference numerals 906 and 907 denote generation of new CRC bits by exclusive-OR gating the 8 CRC bits and the 6-bit MAC ID 809. The exclusive-OR gating operation is performed by the exclusive-OR gate 909. To match to the number of the CRC bits, two bits of zeroes are padded to the start or end of the MAC ID. For example, the MAC ID is "010110", it is padded to "00010110" or "01011000". A determiner 908 compares the new 8 CRC bits 907 with the CRC bits in the convolutional decoder output sequence 902. If they are identical, the determiner 908 determines that the CRC check result is "good". If they are different, the determiner 908 determines that the CRC check result is "failed".

A CRC checker illustrated in FIG. 9B operates in the same manner as that illustrated in FIG. 9A, except for CRC detection in step 905. Referring to FIG. 9B, 8 CRC bits output from the CRC checker 804 of FIG. 8 are exclusive-OR gated with an 8-bit MAC ID. The exclusive-OR gating operation is performed by the exclusive-OR gate 909. The resulting bits are set as new CRC bits. This embodiment is also applicable to a second PDCCH receiver illustrated in FIG. 10.

In the embodiment of CRC checking illustrated in FIG. 9B, an MS receives packet data control information as follows.

(Step 1) The MS receives control information and a MAC ID from a BS. The control information was attached with CRC bits and the MAC ID was (n, k) block-encoded in a BS, prior to transmission. Here, n is the number of CRC bits and k is the bit number of a MAC ID before block encoding.

(Step 2) The CRC checker 804 detects the CRC bits from the control information.

(Step 3) An exclusive-OR gate 909 exclusive-OR gates the detected CRC bits with the (n, k) block-encoded MAC ID and thus generates new CRC bits.

(Step 4) The determiner 805 compares the detected CRC bits with the generated CRC bits. If they are identical, it is determined that the control information is for the MS.

Figure 10:
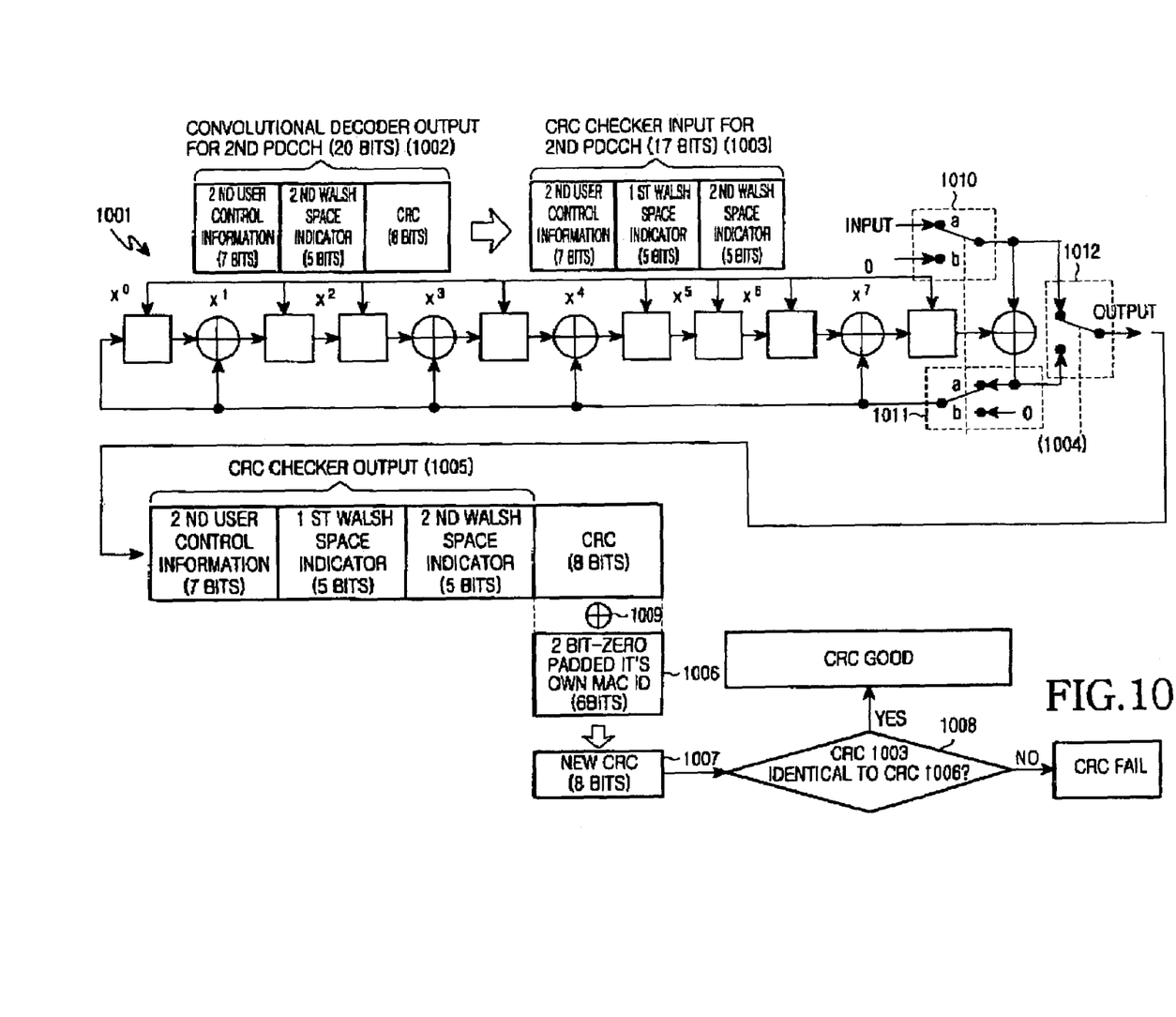
FIG. 10 illustrates a CRC checker for the second PDCCH according to the embodiment of the present invention.

FIG. 10 illustrates a CRC checker for CRC-checking the second PDCCH under the control of the controller 808 illustrated in FIG. 8.

Referring to FIG. 10, reference numeral 1001 denotes a typical CRC checker, reference numeral 1002 denotes a 20-bit convolutional decoder output sequence of the second PDCCH, and reference numeral 1003 denotes a 17-bit sequence of the second PDCCH input to the CRC checker 1001. The CRC checker input sequence 1003 includes 7-bit second user control information, a 5-bit second Walsh space indicator, and the 5-bit first Walsh space indicator output from the convolutional decoder 803 for the first PDCCH. Reference numeral 1004 denotes switching in the CRC checker 1001. Switches 1010, 1011 and 1012 are the same in structure to the switches illustrated in FIGS. 5A, 5B, 6, 9A and 9B. For the 17-bit input sequence, the switches 1010, 1011, and 1012 switch up and for the following 8 bits, they switch down. For the first 17 bits, the switches 1010 and 1011 switch to input signals other than zero. The switch 1012 switches to the output of the switch 1010. Then for the next 8 bits, the switches 1010 and 1011 switch to output zeroes, and the switch 1012 switches to the output of an adder.

Reference numeral 1005 denotes bits output from the CRC checker 1001. The CRC checker output includes the 17-bit input sequence and 8 CRC bits. Reference numerals 1006 and 1007 denote generation of new CRC bits by exclusive-OR gating the 8 CRC bits and the 6-bit MAC ID 809. The exclusive-OR gating operation is performed by the exclusive-OR gate 1009. To match to the number of the CRC bits, two bits of zeroes are padded to the start or end of the MAC ID. For example, the MAC ID is "010110", it is padded to "00010110" or "01011000". A determiner 1008 compares the new 8 CRC bits 1007 with the CRC bits in the convolutional decoder output sequence 1002. If they are identical, the determiner 1008 determines that the CRC check result is "good". If they are different, the determiner 1008 determines that the CRC check result is "failed".

As described above, the use of the PDCCHs according to the present invention enables PDCH transmission in TDM/CDM in a mobile communication system supporting packet data transmission. Especially, CRC generators and CRC checker of the present invention allow a second user to utilize control information on the first PDCCH.

While the invention has been shown and described with reference to certain preferred embodiments thereof, it is a mere exemplary application. For example, while only two users receive a PDCH in TDM/CDM, the present invention is applicable to more users. In addition, the number of CRC bits can be increased to 10, 12, 14, or 16 bits, though it is 8 bits in the embodiment of the present invention. Thus, it will be understood by those skilled in the art that various changes in form and details may be made therein without departing from the spirit and scope of the invention as defined by the appended claims.

What is claimed is:

1. A control information transmitting method in a base station (BS) of a mobile communication system, the BS transmitting data to a mobile station (MS), and transmitting an identifier (ID) of the MS and control information about the data to the MS, the method comprising the steps of:
    generating first error detection bits;
    generating second error detection bits by exclusive-OR gating the first error detection bits and the MS ID;
    generating new control information by attaching the second error detection bits to the control information; and
    transmitting the new control information.

2. The method of claim 1, further comprising the step of padding a predetermined number of zeroes to the MS ID so that the MS ID has the same number of bits as the first error detection bits.

3. The method of claim 1, further comprising the step of block-encoding the MS ID so that the MS ID has the same number of bits as the first error detection bits.

4. The method of claim 1, wherein the control information includes a Walsh space indicator indicating a Walsh code used for the data.

5. A method of transmitting control information to a second mobile station (MS) in a base station (BS) of the mobile communication system, the BS transmitting data to at least two MSs, transmitting to a first MS first control information about the data and an identifier (ID) of the first MS, and transmitting to a second MS the first control information, second information and the ID of the second MS, the method comprising the steps of:
    receiving the first and second control information and generating a third control information by attaching first error detection bits to the first and second control information;
    generating second error detection bits by exclusive-OR gating the first error detection bits with the ID of the second MS;
    generating fourth control information by attaching the second error detection bits to the second control information; and
    transmitting the fourth control information.

6. The method of claim 5, further comprising the step of padding a predetermined number of zeroes to the second MS ID so that the second MS ID has the same number of bits as the first error detection bits.

7. The method of claim 5, further comprising the step of block-encoding the second MS ID so that the second MS ID has the same number of bits as the first error detection bits.

8. The method of claim 5, wherein the first control information includes a Walsh space indicator indicating a Walsh code used for the data for the first MS, and the second control information includes a Walsh space indicator indicating a Walsh code used for the data for the second MS.

9. A control information receiving method in a mobile station (MS) of a mobile communication system where a base station (BS) transmits data and error detection control information about the data to the MS, the control information including first error detection bits, the method comprising the steps of:
    receiving the control information;
    generating second error detection bits by exclusive-OR gating the first error detection bits with an identifier (ID) of the MS;
    comparing the first error detection bits with the second error detection bits; and
    determining that the control information is for the MS if the first error detection bits are identical to the second error detection bits.

10. The method of claim 9, further comprising the step of padding a predetermined number of zeroes to the MS ID so that the MS ID has the same number of bits as the first error detection bits.

11. The method of claim 9, further comprising the step of block-encoding the MS ID so that the MS ID has the same number of bits as the first error detection bits.

12. The method of claim 9, wherein the control information includes a Walsh space indicator indicating a Walsh code used for the data.

13. A control information transmitting apparatus in a base station (BS) of a mobile communication system, the BS transmitting data to a mobile station (MS), and transmitting an identifier (ID) of the MS and control information about the data to the MS, the apparatus comprising:
    an error detection bit generator for generating first error detection bits;
    an exclusive-OR operator for generating second error detection bits by exclusive-OR gating the first error detection bits and the MS ID; and
    a transmitter for generating new control information by attaching the second error detection bits to the control information and transmitting the new control information.

14. The apparatus of claim 13, further comprising a bit inserter for inserting a predetermined number of zero bits to the MS ID so that the MS ID has the same number of bits as the first error detection bits.

15. The apparatus of claim 13, further comprising a block encoder for block-encoding the MS ID so that the MS ID has the same number of bits as the first error detection bits.

16. The apparatus of claim 13, wherein the control information includes a Walsh space indicator indicating a Walsh code used for the data.

17. A control information receiving apparatus in a mobile station (MS) of a mobile communication system where a base station (BS) transmits data and error detection control information about the data to the MS, the control information including first error detection bits, the apparatus comprising:
    a receiver for receiving the control information;
    an exclusive-OR operator for generating second error detection bits by exclusive-OR gating the first error detection bits with an identifier (ID) of the MS; and
    a determiner for comparing the first error detection bits with the second error detection bits and, if the first error detection bits are identical to the second error detection bits, determining that the control information is for the MS.

18. The apparatus of claim 17, further comprising a bit inserter for inserting a predetermined number of zero bits to the MS ID so that the MS ID has the same number of bits as the first error detection bits.

19. The apparatus of claim 17, further comprising a block encoder for block-encoding the MS ID so that the MS ID has the same number of bits as the first error detection bits.

20. The apparatus of claim 17, wherein the control information includes a Walsh space indicator indicating a Walsh code used for the data.

* * * * *